United States Patent
Cox et al.

(10) Patent No.: US 9,792,532 B2
(45) Date of Patent: Oct. 17, 2017

(54) SYSTEMS AND METHODS FOR MACHINE LEARNING ENHANCED BY HUMAN MEASUREMENTS

(71) Applicant: PRESIDENT AND FELLOWS OF HARVARD COLLEGE, Cambridge, MA (US)

(72) Inventors: David Cox, Somerville, MA (US); Walter Scheirer, Somerville, MA (US); Samuel Anthony, Cambridge, MA (US); Ken Nakayama, Cambridge, MA (US)

(73) Assignee: PRESIDENT AND FELLOWS OF HARVARD COLLEGE, Cambridge, MA (US)

(*) Notice: Subject to any disclaimer, the term of this patent is extended or adjusted under 35 U.S.C. 154(b) by 107 days.

(21) Appl. No.: 14/900,397

(22) PCT Filed: Jun. 26, 2014

(86) PCT No.: PCT/US2014/044376
§ 371 (c)(1),
(2) Date: Dec. 21, 2015

(87) PCT Pub. No.: WO2014/210334
PCT Pub. Date: Dec. 31, 2014

(65) Prior Publication Data
US 2016/0148077 A1    May 26, 2016

Related U.S. Application Data

(60) Provisional application No. 61/840,871, filed on Jun. 28, 2013.

(51) Int. Cl.
*G06K 9/00* (2006.01)
*G06K 9/62* (2006.01)

(52) U.S. Cl.
CPC ....... *G06K 9/6263* (2013.01); *G06K 9/00288* (2013.01); *G06K 9/627* (2013.01)

(58) Field of Classification Search
CPC ... G06K 9/6263; G06K 9/00288; G06K 9/627
See application file for complete search history.

(56) References Cited

U.S. PATENT DOCUMENTS

| | | | |
|---|---|---|---|
| 8,923,655 B1* | 12/2014 | Weston | G06F 17/30274 382/115 |
| 2005/0010553 A1* | 1/2005 | Liu | G06F 17/30265 |
| 2009/0137924 A1* | 5/2009 | Kapoor | A61B 5/04012 600/545 |

* cited by examiner

*Primary Examiner* — Jonathan S Lee
(74) *Attorney, Agent, or Firm* — Morgan, Lewis & Bockius LLP

(57) ABSTRACT

In various embodiments, training objects are classified by human annotators, psychometric data characterizing the annotation of the training objects is acquired, a human-weighted loss function based at least in part on the classification data and the psychometric data is computationally derived, and one or more features of a query object are computationally classified based at least in part on the human-weighted loss function.

17 Claims, 13 Drawing Sheets

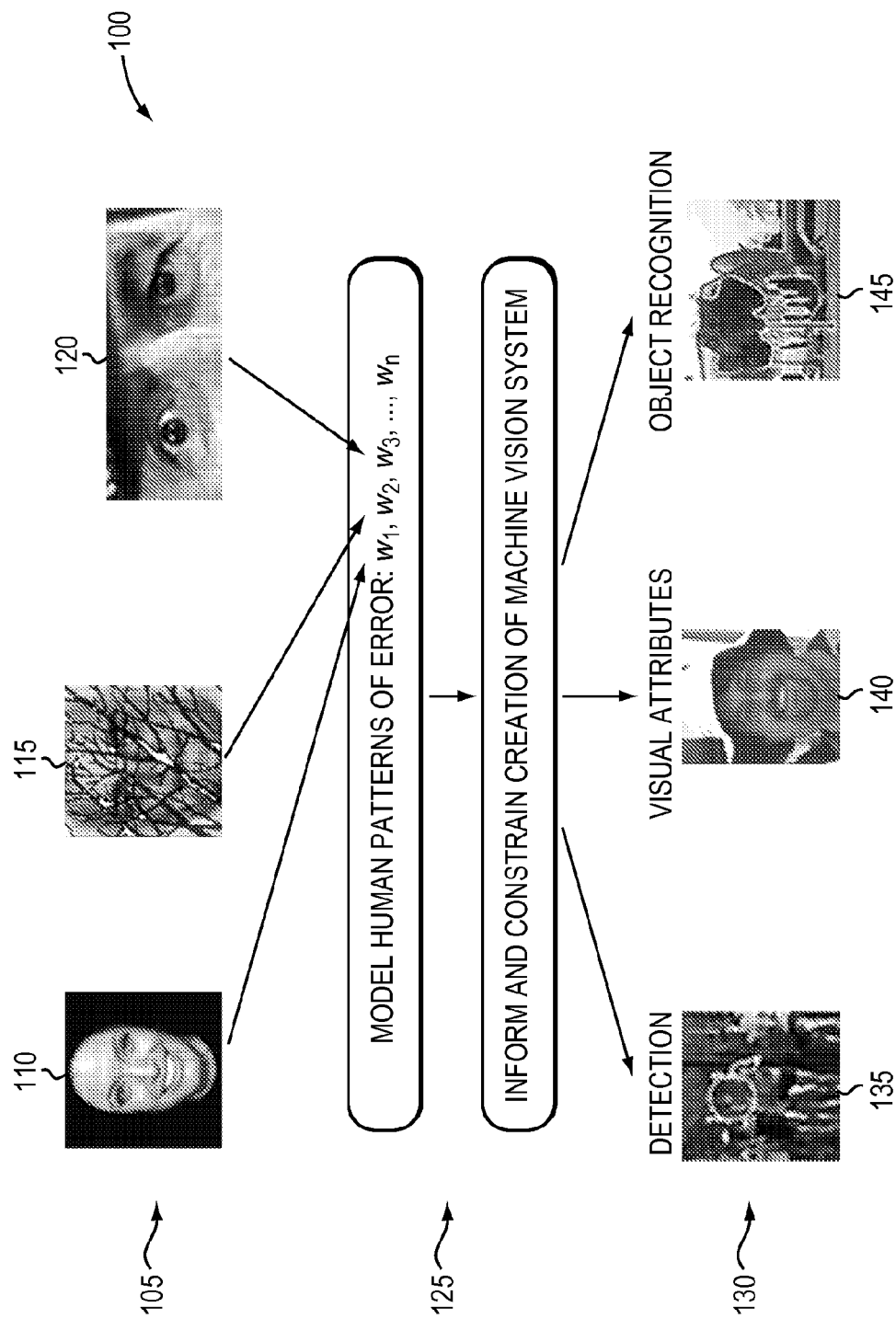

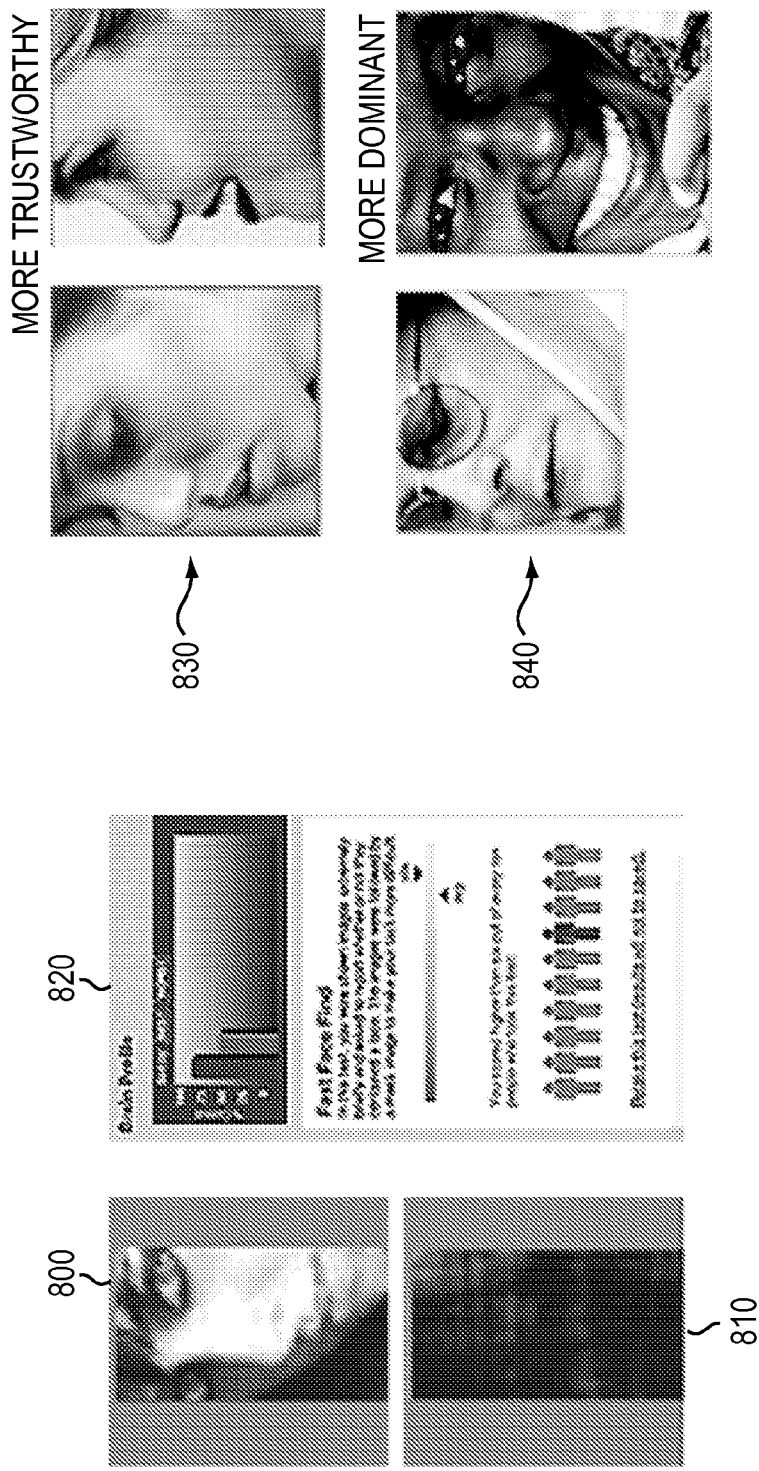

SYSTEMS AND METHODS FOR MACHINE LEARNING ENHANCED BY HUMAN MEASUREMENTS

RELATED APPLICATION

This application claims the benefit of and priority to U.S. Provisional Patent Application No. 61/840,871, filed Jun. 28, 2013, the entire disclosure of which is hereby incorporated herein by reference.

STATEMENT REGARDING FEDERALLY SPONSORED RESEARCH OR DEVELOPMENT

This invention was made with government support under Grant Number IIS-0963668 awarded by the National Science Foundation. The government has certain rights in the invention.

TECHNICAL FIELD

In various embodiments, the present invention relates to machine learning, in particular to machine learning augmented by measurements acquired from human populations.

BACKGROUND

Traditional machine-learning algorithms typically incorporate human knowledge (at least implicitly) as an input—for instance, a machine-learning system trained to decide whether a face is present in an image will be given set of human-generated "ground truth" labels that signal whether a human judged the image to contain a face or not. In this case, the job of the machine-learning system is to emit analogous labels (for example, "face present" and "face not present") in response to new, previously unseen images.

While great progress has been made in the field of machine learning, the performance of machine-learning systems often falls far short human levels of performance, particularly in the domain of machine vision. A key limiting factor is the unavailability of labeled data; it is difficult to provide an algorithm with enough labeled training data to achieve optimal performance. Without sufficiently large datasets, machine-learning algorithms tend to "overfit" the data, adapting to spurious structure present in the training set that is not representative of the larger distribution of all examples in the real world. Machine-learning systems typically combat the effects of overfitting by a process called "regularization," in which penalties are placed on solutions that are thought to be more likely to be the result of overfitting, typically because they are more complex or because they exhibit less stable behavior under injected noise.

Thus, there is a need for machine-learning systems and techniques that incorporate not only larger sets of human-labeled data, but also utilize such data to regularize solutions to machine-learning problems in novel ways to better mimic human performance.

SUMMARY

In accordance with various embodiments of the present invention, large sets of human-derived data containing different types of information are utilized to provide ground-truth labels for regularization of machine-learning systems. An advantageous aspect of embodiments of the invention is that details and patterns of human performance under difficult conditions may be used to regularize solutions to machine-learning problems. For example, information about how difficult it is for a human to label each training example in a dataset may be utilized as at least a portion of the basis for a powerful regularizer. Specifically, learned solutions that deviate substantially from the human patterns of difficulty may be penalized. For example, greater penalties may be introduced for misclassification, on the part of the machine-learning system, of examples that are easily classified by humans. Similarly, lesser penalties may be introduced for misclassification of examples that are relatively more difficult for humans to classify. By imposing such additional weightings in the objective function of the machine-learning algorithm, the system may be influenced to produce more "human-like" solutions, effectively leveraging fine-grained information resulting from the extremely sophisticated learning mechanisms present in humans, along with the vast wealth of experience (i.e., training data) that the human has received. Techniques for incorporating a wide range of measurements of human knowledge and perception into machine-learning algorithms are also referred to herein as "deep annotation."

A variety of well-known techniques exist for measuring human performance, including reaction time measurement (i.e., how quickly is the label generated), the generation of psychophysical curves under stimulus degradation (e.g., how does performance fall-off as the image becomes less clear), item-response curves across large populations of humans (e.g., how consistent are judgment across a population), and many other techniques falling under the umbrella of the field of psychophysics. Any or all of these techniques may be used as additional streams of input in accordance with embodiments of the present invention.

In an aspect, embodiments of the invention feature a computer-implemented method for data classification and identification. Data corresponding to a plurality of training objects is provided, over a computer network, to a plurality of training devices each associated with one of a plurality of human annotators. Each of the training objects includes or consists essentially of features for classification. The training objects are displayed on a display of each of the training devices. Classification data is received via communication interfaces of at least some of the training devices. The classification data includes or consists essentially of at least some of the training objects annotated, via annotation interfaces of the training devices, by at least some of the annotators with classifications for features thereof. Psychometric data characterizing the annotation of the training objects by the annotators is acquired. A human-weighted loss function based at least in part on the classification data and the psychometric data is computationally derived. The human-weighted loss function includes penalties for misclassification, magnitudes of the penalties increasing with increasing deviation from the classification data. Data corresponding to a query object different from the plurality of training objects is received by a classification device. Thereafter, at least one feature of the query object is computationally classified by a computer processor based at least in part on the human-weighted loss function.

Embodiments of the invention feature one or more of the following in any of a variety of combinations. The classification of the at least one feature of the query object may be displayed. The magnitudes of the penalties for misclassification may be based at least in part on the psychometric data. Computationally deriving the human-weighted loss function may include or consist essentially of (i) computationally classifying, by the computer processor, at least some of the training objects based at least in part on an initial loss function, thereby generating training data, (ii) comparing the training data to the classification data to identify, within the training data, features misclassified in comparison to the classification data, (iii) assigning the penalties for misclassification to the misclassified features in the training data, and (iv) incorporating the penalties for misclassification within the initial loss function to generate the human-weighted loss function. The penalties for misclassification may be assigned based at least in part on the psychometric data. The initial loss function may include or consist essentially of a hinge loss function (e.g., a linear hinge loss function). The psychometric data may include or consist essentially of (i) response time for classifying one or more features, (ii) accuracy of feature classification, and/or (iii) presentation time of one or more training objects. Each of the training objects may include or consist essentially of a digital image, and one or more features for classification may include or consist essentially of human faces. At least one of the training devices may include or consist essentially of a computer or mobile computing device. The query object may include or consist essentially of a digital image, and at least one said feature of the query object may include or consist essentially of a human face.

In another aspect, embodiments of the invention feature a system for data classification and identification. The system includes or consists essentially of a database of training objects, a computer processor, a classification device, a penalization module, and a classification module. The database includes or consists essentially of a storage medium populated with stored computer records specifying, for each of a plurality of training objects, (i) classification data comprising annotations received from a plurality of human annotators, and (ii) psychometric data characterizing the annotation of the training object by the plurality of human annotators. The classification device is configured to receive query objects, which may be different from the training objects in the database. The penalization module is executable by the computer processor and is configured to derive a human-weighted loss function based at in part on the classification data in the database and the psychometric data of at least some of the training objects in the database. The loss function includes penalties for misclassification, and the magnitudes of the penalties increase with increasing deviation from the classification data. The classification module is executable by the computer processor and is configured to classify features of query objects based at least in part on the human-weighted loss function.

Embodiments of the invention feature one or more of the following in any of a variety of combinations. The system may include a display module that is executable by the computer processor and configured to display training objects to the plurality of human annotators. The system may include a plurality of training devices, each associated with a human annotator, for displaying training objects. Each training device may include a communication interface for receiving training objects and transmitting classification data. At least one of the training devices may include or consist essentially of a computer or mobile computing device. The psychometric data may include or consist essentially of (i) response time for classifying one or more features, (ii) accuracy of feature classification, and/or (iii) presentation time of one or more training objects. Each of the training objects may include or consist essentially of a digital image, and one or more features for classification may include or consist essentially of human faces. At least one query object may include or consist essentially of a digital image, and at least one feature of the query object may include or consist essentially of a human face.

These and other objects, along with advantages and features of the present invention herein disclosed, will become more apparent through reference to the following description, the accompanying drawings, and the claims. Furthermore, it is to be understood that the features of the various embodiments described herein are not mutually exclusive and may exist in various combinations and permutations. As used herein, the terms "approximately" and "substantially" mean±10%, and in some embodiments, ±5%. The term "consists essentially of" means excluding other materials that contribute to function, unless otherwise defined herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which:

FIGS. 1A and 1B are schematic block diagrams of classification systems in accordance with various embodiments of the invention;

FIGS. 8A and 8B are pictures of various training objects, and training results, provided to annotators in accordance with various embodiments of the invention;

DETAILED DESCRIPTION

Figure 1B:
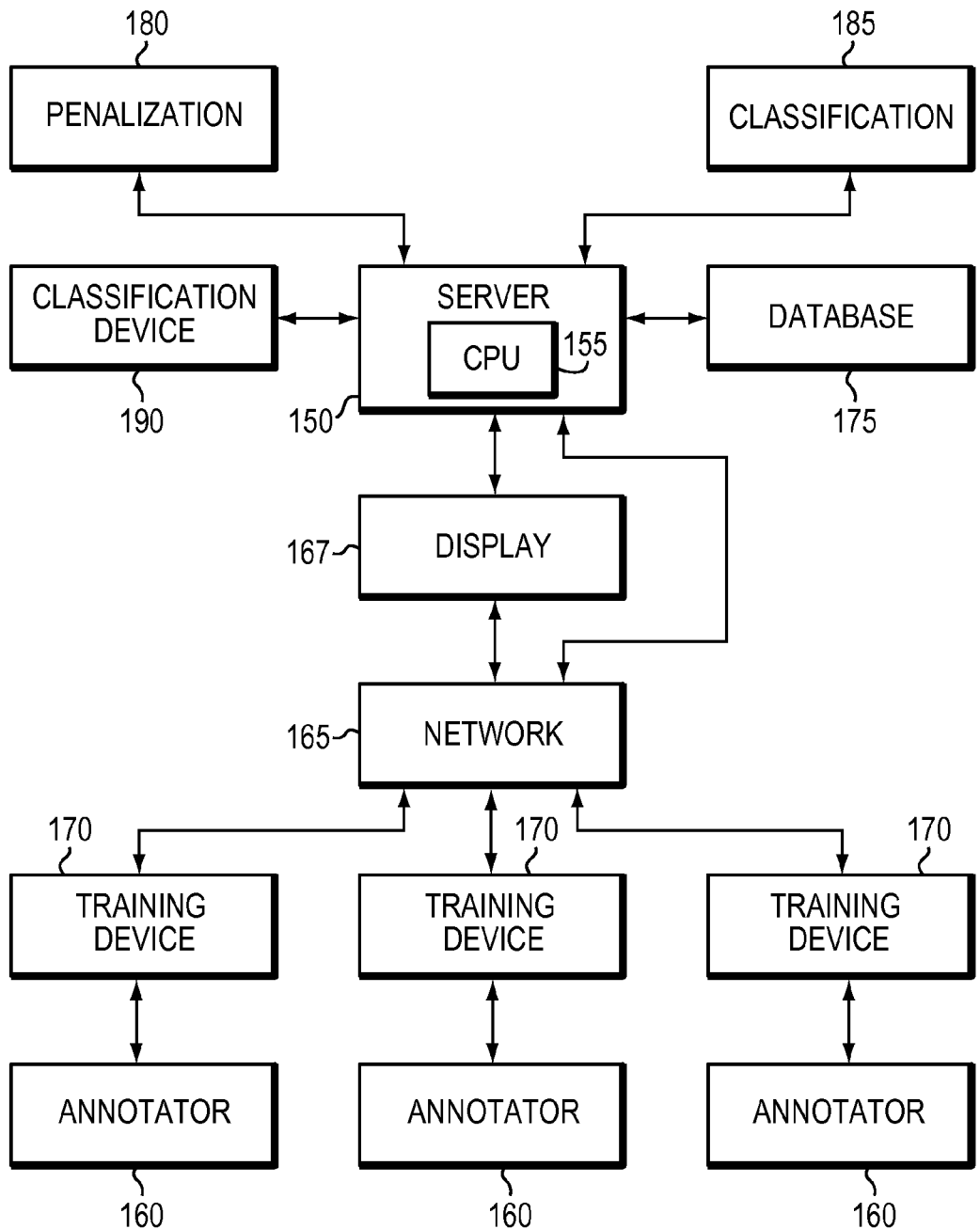

In various embodiments of the invention, patterns of human errors under purposely challenging conditions are used to weight the margins of a linear kernel machine, which may then be utilized for practical machine-learning tasks such as machine vision (e.g., face detection). For example, large-scale visual psychophysics experiments may be utilized to inform the learning at an algorithmic level, which is quite different from the traditional "query the oracle" model for image-specific labels. Embodiments of the invention build more intelligent weighed loss functions from overall models of human decisions.

Many computer vision systems attempt to mimic natural human visual abilities in machines—object and face recognition, scene understanding, image segmentation, and medical image analysis, to name just a few. Indeed, any setting where human-provided labels are used as ground truth—whether the system aspires to be biologically-inspired or not—is ultimately driven by the human visual system and its ability to provide accurate labels. However, while human judgments already provide essential raw material for machine learning, human-generated labels represent only a small fraction of the potential information that may be extracted from human subjects. Human behavior is intrinsically multidimensional—a given judgment may be correct or incorrect, but it is also associated with a wealth of other information, such as a reaction time. Moreover, if stimuli are degraded (e.g., by additive noise) or appear quickly, a rich landscape of performance emerges even for behaviors that humans normally perform almost perfectly. Patterns of errors across stimuli may yield important information about the computations being performed, and the distribution of performance across a large population of humans may yield important insights into which elements of a perceptual ability are consistently expressed and which are not. The science of visual psychophysics has long exploited these external clues to provide key insights into the inner workings of human perception. Embodiments of invention utilize these sophisticated tools with state-of-the-art machine vision and machine learning.

A key challenge in machine vision, and machine learning in general, is that the quantity of available training data is typically small, and this limits a system's ability to effectively learn. Embodiments of the invention leverage human psychophysics to address this problem via a concerted effort in several ways. First, advanced crowd-sourcing technologies are utilized to dramatically improve the quality, quantity, and depth of annotation data available for learning. Second, these new kinds of information—"deep" annotations—are utilized in a machine-learning context. In particular, various embodiments utilize the concept of oracle-assisted learning: learning in a setting where powerful, but opaque, black-box systems—in this case, humans—are available for interrogation. While in some instances it may remain infeasible to dramatically increase the amount of data available for training of a given system, measuring the example-by-example difficulty and pattern of errors of the more powerful system may provide important information for regularizing the solution of the system at hand.

Elements of an exemplary system 100 in accordance with an embodiment of the present invention are summarized in FIG. 1A, with three main areas of operation. As shown, an element 105 corresponds to crowd-sourced visual psychophysics, in which, e.g., human participants perform tasks via a webform hosted at a public website. For example, a participant may be shown (1) an image 110 of a person and asked that person's gender, (2) an image 115 of a partially obscured image (shown in FIG. 1A as a person's face obscured by branches) and asked if a face is present, and/or (3) an image 120 of all or a portion of a person's face and asked to select an emotion that corresponds to the image, e.g., jealous, panicked, arrogant, or hateful. The results of element 105 are utilized to inform an element 125, which corresponds to human-informed machine learning training. As shown, in element 125, the outputs of element 105 may be utilized to model patterns of error, which are then utilized to inform and constrain a machine vision system. Finally, in an element 130, the machine vision system is utilized to solve any of a variety of visual-recognition problems. For example, in an application 135, the system may detect faces in images even in the presence of such obscuring features as occlusion of the face or blur or noise in the image. In an application 140, the system may recognize and assign visual attributes to images. As shown, the system may recognize that an image contains a man and that the man is smiling, has a beard, and is wearing a hat. Finally, in an application 145, the system may be utilized to recognize various other objects in images; as shown, the system may identify objects such as a tree, a car, a bus, a building, and a street in a given image.

As shown in FIG. 1B, in preferred embodiments of the invention, classification systems (or "classifiers") are implemented on a server 150 that includes a computer processor 155 and utilizes various program modules. Program modules may include or consist essentially of computer-executable instructions that are executed by a conventional computer. Generally, program modules include routines, programs, objects, components, data structures, etc. that performs particular tasks or implement particular abstract data types. In accordance with various embodiments of the invention, data is classified and identified by initially providing training objects to multiple human annotators 160 over a computer network 165. As used herein, a "computer network" is any wired and/or wireless configuration of intercommunicating computational nodes, including, without limitation, computers, switches, routers, personal wireless devices, etc., and including local area networks, wide area networks, and telecommunication and public telephone networks. The training objects may include or consist essentially of, for example, data representative of pictures, graphics, video and/or audio files, text or handwriting samples, etc. The subject matter of each training object has certain features that may be classified by at least some of the human annotators 160. For example, the training objects may be digital images containing, e.g., human faces for classification. The training objects may be displayed to the human annotators by a conventional display module 167 via training devices 170; for example, the training devices 170 may be computers, cellular phones, or other mobile devices having audio, graphics, and/or video displays. The display module 167 is executable by the server 150 and/or its computer processor 155. As used herein, the term "display" means rendering the digitally encoded subject matter of a training object so as to be perceivable by a user via any mode of presentation suitable to the particular type of training object, including audio presentation via a speaker or headphones and visual presentation via a monitor or other device. The training devices 170 receive the training objects and/or transmit classification data to the central server 150 via a communication interface such as e-mail, SMS text message, or pages (or "webforms") on hosted websites.

Multiple human annotators 160 annotate at least some of the training objects via annotation interfaces such as touchscreens, touchpads, computer mice or other pointing devices, or keyboards, associated with the training devices 170. During and/or after the annotation, psychometric data is also acquired that characterizes the annotation of the training objects by the annotators 160. For example, as described herein in detail, such psychometric data may include or consist essentially of response times for classifying one or more features, the accuracy of feature classification, and/or the presentation time (i.e., the amount of time presented to each annotator) of one or more training objects. The classification and psychometric data may be stored in a database 175 of training objects accessible by the server 150.

After acquisition of the classification and psychometric data, a human-weighted loss function is computationally derived based at least in part on the psychometric data by, e.g., a penalization module 180 executable by the server 150 and/or its computer processor 155. The loss function includes penalties for misclassification (of later presented query objects, as described below), and the magnitude of the penalties increases with increasing deviation from the classification data received from the human annotators.

Once the human-weighted loss function is determined, one or more "query objects" may be received by the system for classification based on the classification data and the loss function by, e.g., a classification module 185 executable by the server 150 and/or its computer processor 155. The query objects are new objects to be classified by the system absent direct human classification, and may be the same types of objects utilized as training objects but having features that are different in type, placement, number, etc. The query objects may be received by a classification device 190 such as a communication interface to a server or database of objects, a camera or other image- and/or video-capture device, a microphone or other audio-capture device, etc.

Those skilled in the art will appreciate that embodiments of the invention may be practiced with various computer system configurations, including multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote computer-storage media including memory storage devices.

Thus, systems in accordance with embodiments of the present invention may include or consist essentially of a general-purpose computing device in the form of a computer including a processing unit (or "computer processor"), a system memory, and a system bus that couples various system components including the system memory to the processing unit. Computers typically include a variety of computer-readable media that can form part of the system memory and be read by the processing unit. By way of example, and not limitation, computer readable media may include computer storage media and/or communication media. The system memory may include computer storage media in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by processing unit. The data or program modules may include an operating system, application programs, other program modules, and program data. The operating system may be or include a variety of operating systems such as Microsoft WINDOWS operating system, the Unix operating system, the Linux operating system, the Xenix operating system, the IBM AIX operating system, the Hewlett Packard UX operating system, the Novell NETWARE operating system, the Sun Microsystems SOLARIS operating system, the OS/2 operating system, the BeOS operating system, the MACINTOSH operating system, the APACHE operating system, an OPENSTEP operating system or another operating system of platform.

Any suitable programming language may be used to implement without undue experimentation the functions described above. Illustratively, the programming language used may include assembly language, Ada, APL, Basic, C, C++, C*, COBOL, dBase, Forth, FORTRAN, Java, Modula-2, Pascal, Prolog, Python, REXX, and/or JavaScript for example. Further, it is not necessary that a single type of instruction or programming language be utilized in conjunction with the operation of systems and techniques of the invention. Rather, any number of different programming languages may be utilized as is necessary or desirable.

The computing environment may also include other removable/nonremovable, volatile/nonvolatile computer storage media. For example, a hard disk drive may read or write to nonremovable, nonvolatile magnetic media. A magnetic disk drive may read from or writes to a removable, nonvolatile magnetic disk, and an optical disk drive may read from or write to a removable, nonvolatile optical disk such as a CD-ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or nonremovable memory interface.

The processing unit that executes commands and instructions may be a general-purpose computer processor, but may utilize any of a wide variety of other technologies including special-purpose hardware, a microcomputer, mini-computer, mainframe computer, programmed micro-processor, microcontroller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID processor, smart chip, or any other device or arrangement of devices that is capable of implementing the steps of the processes of embodiments of the invention.

Figure 2:
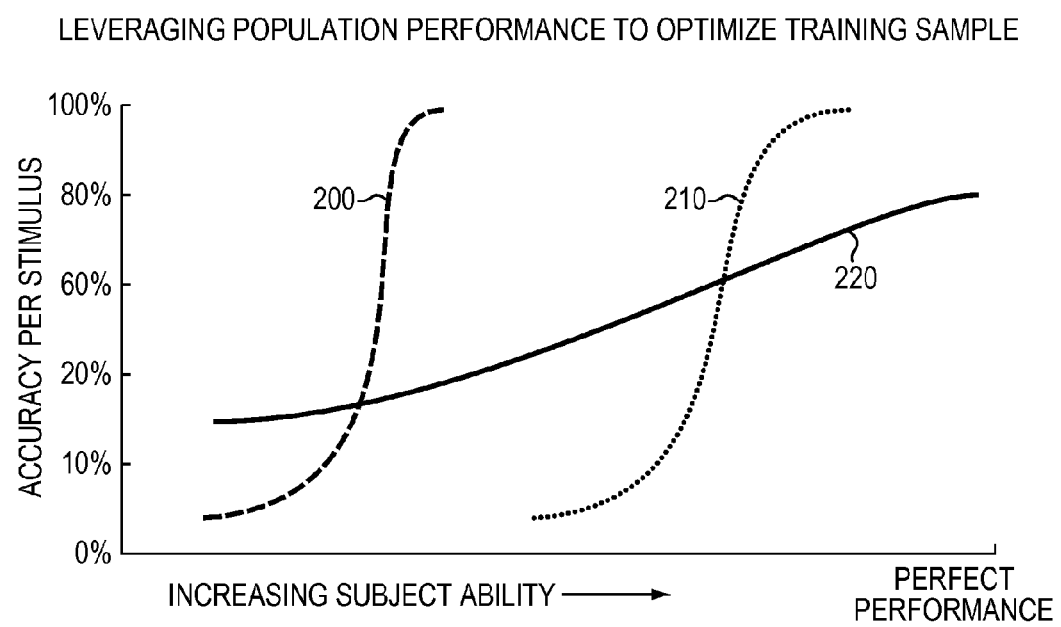
FIG. 2 is a graph of three item response functions for images presented on classification systems in accordance with various embodiments of the invention.

In accordance with various embodiments of the present invention, psychometric testing is organized around two primary measures: accuracy and response time. Each of these measures may be used on an individual image, pooled for all subjects, or pooled for particular subjects. Thus, accuracy and reaction time may be measured on a per-image, per-subject, or per-condition level. When measured on a per-image level, mean accuracy provides a measure of how difficult a given trial is over the subject population. However, more refined information may often be obtained by performance per subject. Some "easy" images will be identified by all subjects, no matter what their ability level, whereas others will only be identified by highly skilled observers. This information may also be used effectively to target specific performance goals for systems in accordance with embodiments of the present invention. FIG. 2 provides an example of the types of per-image information that may be extracted using item-response testing and then integrated into the system. FIG. 2 depicts three item response functions for images presented on a crowd-sourced data-acquisition platform (or "classifier," e.g., a website hosted by the server 150 connected to the computer network 165). The x-axis represents a latent measure of ability on an underlying perceptual task (such as face or attribute detection). An easy curve 200 represents an image that differentiates subjects with a low latent ability to perform the detection task. A hard curve 210 represents an image that differentiates subjects with a low latent ability to perform the detection task. Each of the curves 200, 210 has a steep slope; this indicates that these images are very effective at determining whether a subject's overall performance is likely to be to the left (better) or right (worse) compared to that curve on the x-axis. A problematic curve 220 has a very shallow slope; this means it discriminates between subjects poorly, as performance classifying the image represented by curve 220 does not vary widely for subjects along the ability scale.

This process of determining the accuracy curves per image so as to design more efficient tests is also referred to herein as item response testing (IRT). It is not the only method of extracting per-image psychometric data, but it is an exemplary embodiment of the type of second-order statistical information that may be collected and applied to the training of computer-vision systems in accordance with embodiments of the invention. One benefit of IRT and related approaches is that—because the x-axis is a transformed latent variable, as opposed to a parameterized manipulation—it is typically possible to determine difficulty rankings for natural images that have not been parameterized; the transformation acts to pool information on item difficulty across all subjects.

Accuracy may be recorded in multiple ways; most commonly a response is a binary keypress or button click recorded on a per-trial basis. When measured per-subject, on many types of tests mean accuracy is compared to a non-zero chance accuracy (so, for instance, on a two-alternative forced choice ("2-AFC") task, chance performance would be 50%). When measured on a per-stimulus level, mean accuracy provides a measure of how difficult a given trial is over the subject population. Such data may be analyzed even more finely; for example, various embodiments utilize mean accuracy per presentation time, presentation location, per condition, condition by subject, and so on. In these latter cases the function may be graphed as, and fit to, a psychometric function of accuracy per parameter, depending on the specific needs for a particular deeply annotated training set.

Figure 3:
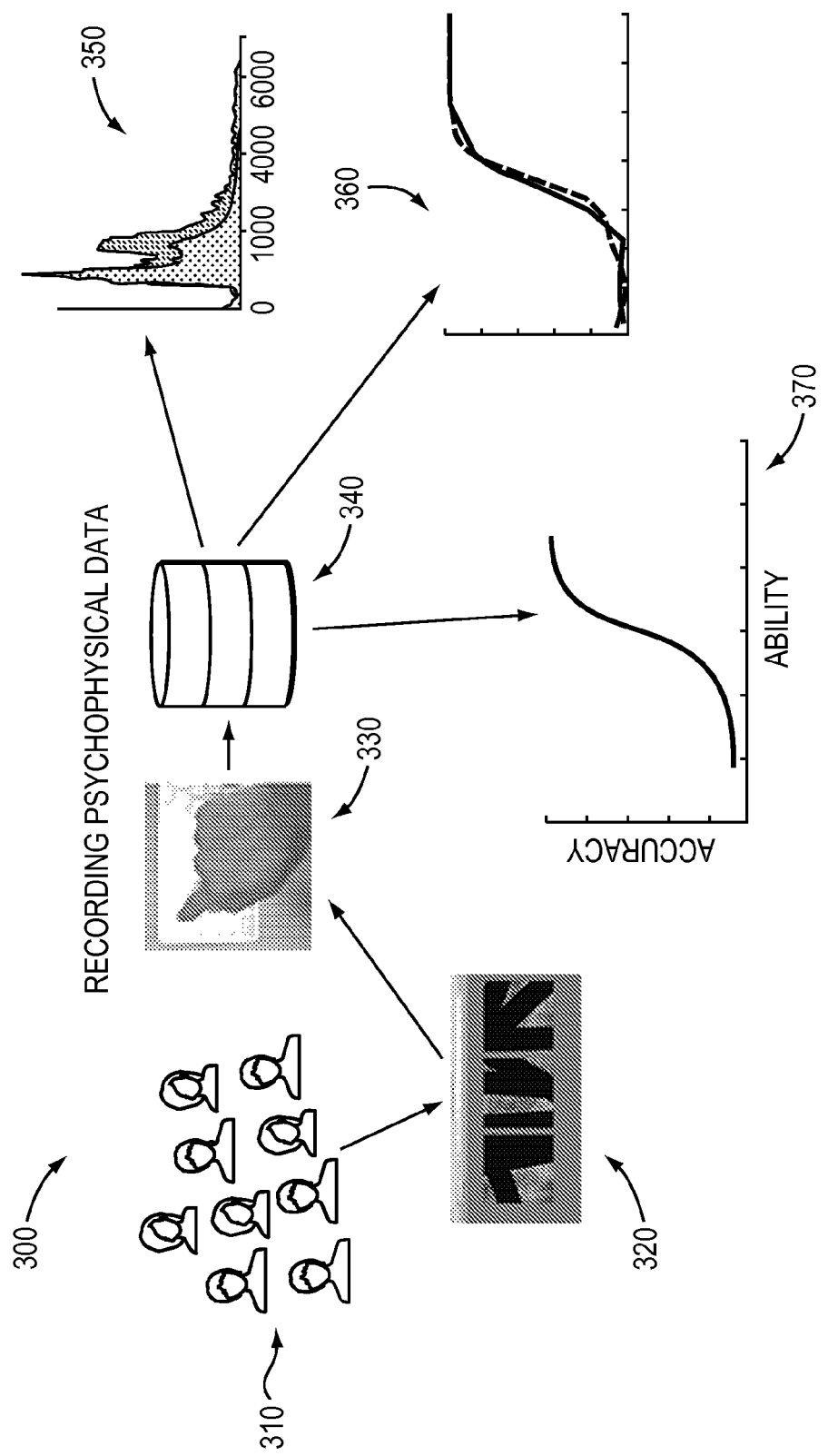
FIG. 3 is a pictorial flowchart of a technique of acquiring psychometric data in accordance with various embodiments of the invention.

Response time may be characterized as the sum of reaction time and motion time for making a response. Preferred embodiments of the present invention utilize data sets in which the motion time is substantially constant. Web-based response time may include another component—the timing lag incurred by a browser (e.g., the browser's Javascript execution environment). However, in embodiments of the invention response time (RT) may be analyzed in much the same way as accuracy: per-subject, per-stimulus, per-condition, and all the variations in between. Response time may provide useful additional information, as it may serve as a difficulty metric on tasks (such as many face-perception tasks) where human subjects are basically perfect across the board. Even if the mean accuracy of a given stimulus is 100%, it may have a longer mean response time than another 100% accurate stimulus, indicating relatively greater difficulty. FIG. 3 depicts a graphical representation of a process 300 of recording psychophysical data from subjects in accordance with embodiments of the invention. Specifically, FIG. 3 shows an example of a crowd-sourced data-acquisition work flow for an experiment that involves the sequential presentation of some number n of trials (featuring one or more images) to m visitors to a hosted website, where for each image that visitor has to make a classification decision; the displayed example is for a test that uses a key-press response, but the basic design also applies to tests that use mouse clicks or other methods of capturing subject responses. In a step 310, human annotators 160 utilize training devices 170 to communicate with the server 150 (e.g., via display module 167, which displays the hosted website) over the computer network 165. In a step 320, n images (i.e., the training objects) are presented to a number m of the annotators 160. In a step 330, the annotators 160 utilize the training devices 170 to classify the training objects via, e.g., key-presses and/or mouse-button clicks. The psychometric data acquired during step 330, e.g., accuracy of image characterization, response time, presentation time, etc., is recorded in the database 175 in a step 340. The psychometric data may be displayed to analyze, e.g., response time per annotator in a graph 350, a psychometric function 360 related to the accuracy of the annotation per condition, and/or an item response curve 370 for each of the training objects (i.e., the presented images).

Figure 6A:
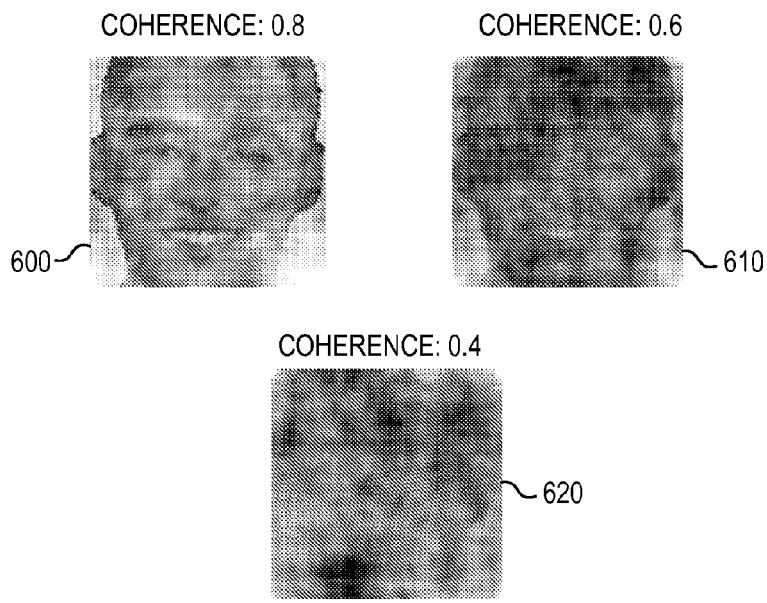
FIG. 6A depicts images of faces at various levels of image coherence, in accordance with various embodiments of the invention.
Figure 6B:
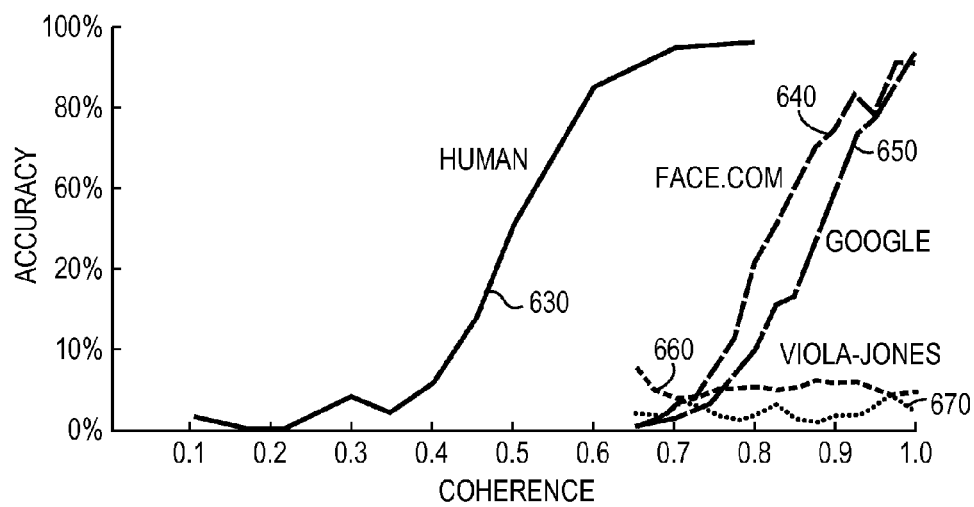
FIG. 6B is a graph of the accuracy of various techniques of facial recognition as a function of coherence, in accordance with various embodiments of the invention.

The term "psychometric function," as mentioned above, herein refers to a function that relates accuracy (on either an individual subject or pooled-subject level) to a given parameter. There are many functions that fit this characteristic shape, but in various embodiments the most important characteristics that the function describes are a sub-threshold region where the participant performs at chance, a rising region where performance improves rapidly, and a final roll-off of slope as the subject reaches asymptotic (usually 100%) performance. Implicit in the shape of the psychometric curve is a sensory threshold, where the subject is able to correctly perform the task some pre-selected percentage of the time. (The human performance curve depicted in FIG. 6B shows one characteristic shape of a psychometric curve.)

Figure 4:
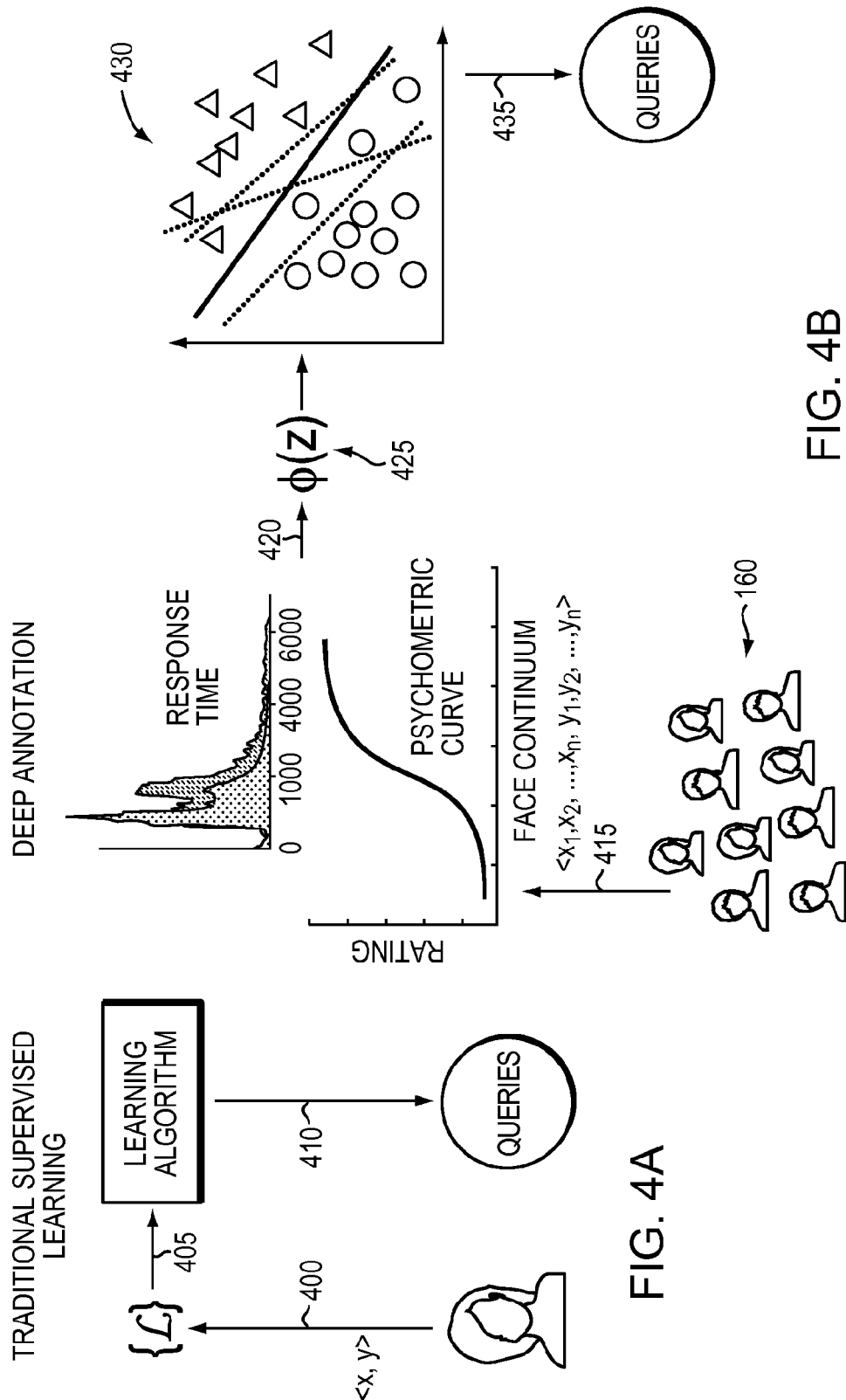
FIG. 4A is a pictorial flowchart of a conventional supervised learning technique.
FIG. 4B is a pictorial flowchart of a deep annotation machine learning technique in accordance with embodiments of the invention.
Figure 5:
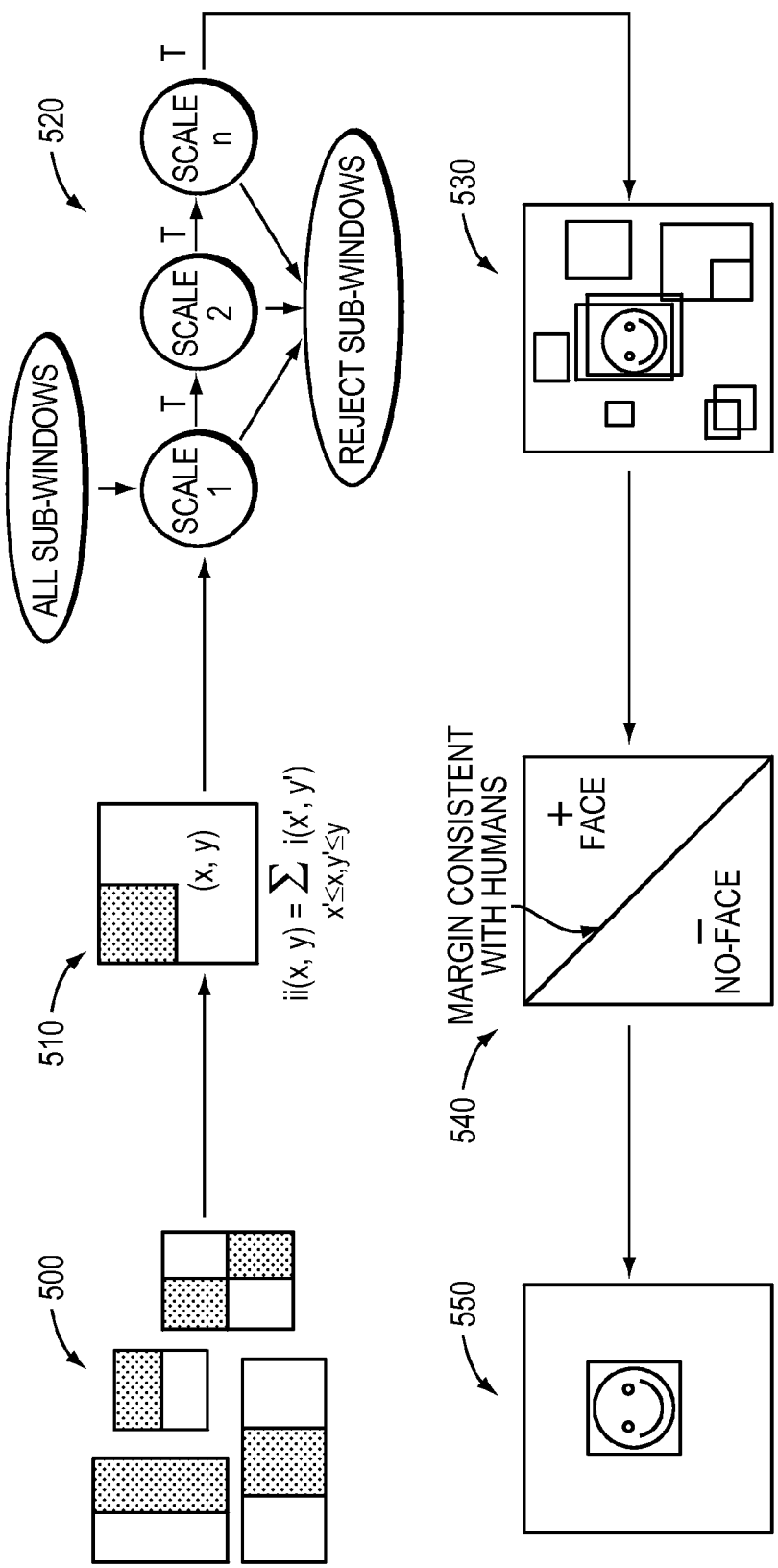
FIG. 5 is a pictorial flowchart of a face-detection method in accordance with various embodiments of the invention.

As mentioned above, while in some instances it may remain infeasible to dramatically increase the amount of data available for training of a given system, measuring the example-by-example difficulty and pattern of errors of more powerful systems may provide important information for regularizing the solution of the system at hand. With this in mind, FIG. 4B depicts an overview of a learning approach in accordance with various embodiments of the present invention, and FIG. 5 illustrates an example of prediction after learning in accordance with various embodiments. FIG. 4B depicts an embodiment of the present invention compared to traditional supervised learning, which is depicted in FIG. 4A. Previous attempts at incorporating humans into the machine learning process at a more detailed level have typically focused on a single human for the labeling of difficult or ambiguous training data for continual improvement of a class model. For example, in FIG. 4A, in a step 400, a human annotator assigns labels to a set of training objects, in a step 405, the labeled data is utilized to train a machine classifier, and in a step 410, the classifier makes predictions in response to queries provided to the classifier.

In contrast, in embodiments of the invention, sets of queries are posed to a crowd, which may be composed of, e.g., citizen scientists (i.e., annotators 160) connected via the computer network 165 to the server 150 that collects, processes, and analyzes the data with the set of processing modules detailed above. The crowd represents a powerful, but opaque black box implementation that is available for interrogation. In the framework of psychophysical experiments, patterns of error may be modeled that may be translated to human-weighted loss functions for classification, as well as penalties for margins that are not consistent with human data during training. Thus, in a step 415, the annotators 160 participate in psychophysical experiments involving the training objects to produce psychometric data (e.g., as described above with respect to FIG. 3), and in a step 420, the data is utilized to model the pattern of the performance of the human annotators 160, resulting in a human-weighted loss function 425 computationally derived by the penalization module 180. The loss function includes penalties for misclassification of later presented query objects, as graphically illustrated in graph 430, and the magnitude of the penalties increases with increasing deviation from the classification data received from the human annotators 160. Finally, in a step 435, the classification module 185 is utilized to make predictions (based on various query objects) that are more consistent with the decisions of the human annotators 160.

FIG. 5 depicts an example embodiment of the invention using the Viola-Jones detector as a basis for face detection. Classifiers conditioned by humans may be used as an augmentation to existing approaches. The Viola-Jones detector is the most common algorithm used for the task of face detection because of its processing speed, for which it trades accuracy. By using a deeply annotated classifier, candidate face windows may be evaluated to a higher degree of accuracy than is possible with just the base Viola-Jones scoring approach. As depicted in FIG. 5, in an embodiment of the present invention the Viola-Jones approach utilizes Haar-like basis functions 500, computes integral images 510 for increased speed, and rapidly scans for candidate windows 520 at different scales. In a step 530, the Viola-Jones scoring process is augmented by utilizing the candidate face windows with the deeply annotated classification system described above (e.g., to classification module 185). In a step 540, false positive face detections are filtered out utilizing the system in accordance with embodiments of the invention, and in a step 550, the best window is selected from a set of possibly valid face detections.

Active learning is one approach to incorporate humans into the machine-learning process at training time. As an alternative, embodiments of the present invention treat the oracle as a large set of participants using crowd-sourcing (i.e., data acquisition from a large population of human annotators 160), e.g., a crowd-sourced citizen science website, as opposed to relying on just a single human annotator. The query process may employ the psychophysical experiments and data described above. Instead of an algorithm querying the oracle in specific cases where difficult or ambiguous data is encountered, the queries in accordance with embodiments of the invention typically occur prior to training and classification, and encompass numerous visual examples. Once the human responses have been analyzed to quantify dominant patterns of error, the models may be translated into human-weighted loss functions for maximum-margin kernel machines and penalties for margins not consistent with human data.

Generally, in any solution to a recognition problem, there is some notion of risk involved that indicates the penalties incurred if a prediction is incorrect. Statistical learning may seek to find a recognition function f that minimizes the ideal risk RI:

$$\operatorname*{argmin}_{f}\left\{R_I(f) := \int_{\mathbb{R}^d \times \mathbb{N}} \phi(x, y, f(x)) P(x, y)\right\}$$

$R_I$ is composed of two terms, the joint distribution of data and labels $P(x, y)$, and the loss function $\phi(x, y, f(x))$, which assigns the cost of misclassification. One component of a human-regularized maximum-margin kernel machine is the addressing of the issue of the loss function. A prediction during training may be calculated as the output of the classifier for a particular training sample multiplied by its label: $z = yf(x)$. In accordance with various embodiments of the invention, a loss function that applies a linearly increasing cost for misclassifications (one-sided error) is desirable. This is embodied by the hinge loss function, which is defined as:

$$\phi(z) = \max(0, 1-z).$$

However, the non-linear nature of psychometric curves for visual recognition tasks suggests a model that is much different than linear loss growth when $z<1$. Therefore, embodiments of the invention assume an alternative model where $wt(x)$ is a weighting function conditioned on a psychometric model for a recognition task t. The weights are determined by the classification data collected from the annotators 160, including the individual and combined statistics of accuracy, response time and presentation time, over a sampling of images across varying degrees of difficulty. Human-weighted loss is thus defined as:

$$\phi(z) = \max(0, w_t(z)).$$

In this formulation, there is more risk associated with misclassifying the deeply annotated training samples, which forces more consistency with the human model for the training data.

Various embodiments of the present invention also directly manipulate margins. Considering a typical support vector machine (SVM) framework, a margin between a decision boundary (hyperplane) and closest data point is defined during training to maximize the separation between classes. As a simple illustration of an embodiment of the invention, consider the most basic linear case, where the margin space is expressed as $\gamma = y_i(w \cdot x_i - b) \geq 1$. w is the normal vector to the decision hyperplane, xi is a real valued vector, and b is an intercept term that helps control the offset of the decision hyperplane from the origin along w. The goal of the SVM optimization process, in accordance with various embodiments, is to maximize parameter $$\frac{2}{\|w\|}$$

by minimizing $\|w\|$. Surprisingly, points near decision boundaries tend to be the most interesting for many recognition problems—knowledge of how humans treat the points in this space may potentially improve margins learned during training. Leveraging gathered psychometric data, embodiments of the invention add another penalty for margins not consistent with human data to the training formulation of common maximum-margin classifiers. During training, the distance between potential margins $\gamma m$ produced by the algorithm in the optimization phase and a human model $\gamma h$ for the problem may be calculated via $\delta = d(\gamma m, \gamma h)$. The resulting penalty $\delta$ may be assigned as an additional weight term: $\|w+\delta\|$. The larger the distance between a potential margin and the oracle-defined model, the larger $\|w+\delta\|$ grows, resulting in a narrow margin that diverges from human expectations. Learning strategies in accordance with various embodiments of the invention incorporate this new margin penalty plus the loss function described above.

In an implementation to serve as a second-stage filter for object detection, embodiments of the invention may train and test on feature vectors computed in a dense grid from an image. Since an exhaustive scan of an image using a sliding window and SVM at multiple scales is often prohibitively expensive computationally, the detection algorithm may leverage a boosted cascade of features as a first stage. By relaxing the neighborhood scoring constraints of such detectors and increasing the number of scales searched by the algorithm, a large number of candidate face patches may be collected. A deeply annotated linear SVM may then be used as a second-stage filter. Patches that are positively identified by the SVM may be grouped into neighborhoods, filtered for redundancy, and scored to produce a set of final detection predictions.

Face detection is a common problem faced by machine-vision systems. This is because the correct localization of faces and within-face landmarks are often necessary preconditions to any higher-order classification (of identity or attributes, for example). Due perhaps in part to this necessity, humans have an exceptionally well developed face-detection ability, one which has not yet been matched by algorithmic performance despite the high level of attention paid.

One of the issues for efforts to compare human and computer performance on face-recognition tasks is the difficulty of quantifying the human learning rate for a given face; while human observers may have seen the most familiar faces hundreds of thousands of independent times, or more, the learning gradient with unfamiliar or partially familiar faces is not easily accessible to empirical investigation. With face detection, by contrast, all human observers are essentially maximally trained experts; this ability is present or begins developing shortly after birth, so the size of the training set may be considered essentially unbounded and performance essentially asymptotic.

Frontal face detection has been an early commercial success in computer vision; the ubiquitous Viola-Jones algorithm of 2001 is both efficient enough to run on a microcontroller and relatively high-performing. Google's StreetView product's ongoing viability is predicated on the efficacy of their face detection and blurring algorithms for privacy. Indeed, the efficacy of Google's algorithm could be all that stands between the company and significant legal liability in many countries. Finally, Facebook is moving quickly into the face detection and recognition space, buying the industry-leading technology of face.com.

In addition to commercial activity, the amount of existing research on face detection is substantial. This provides a tremendous boon for high-throughput comparison methodologies, because the landscape of approaches that have been tried is both vast and heterogeneous; while certain technologies have proven themselves commercial winners, there are any number of different approaches that have had more-or-less broad success at face detection within the commonly used reference datasets, including LFW, AFW, Multi-PIE, and others. Certain algorithms may address the inherent difficulty of detecting unconstrained faces by learning local and global features, often updating models as new information is encountered. In this mode, component-based frameworks, online domain adaptation, and mixtures of tress with a shared pool of parts may be potential solutions. However, even acceptable tolerance to the common effect of occlusion has yet to be achieved by existing algorithms.

Face detection is also a promising task for the creation of deeply-annotated datasets in accordance with embodiments of the present invention because the ecological task includes many natural degradations; face detection in human observers happens in conditions that may include many distinct types of occlusion, among them natural obstructions (trees and other landscape features), man-made obstructions (e.g., cars, fences, windows and other features of the man-made environment), weather conditions (snow, rain, fog) and other people (as, for instance, in crowded environments). All of these occlusion scenarios are relatively common, and all of them evidently present challenges where face-detection system would optimally be expected to perform, at a minimum, at the level of a human observer.

Human performance generally still greatly exceeds machine performance. On a noise-added task, the best available commercial algorithms (as implemented in Google's Picasa software and in face.com's web-accessible API) perform well below the level achieved by human observers even with relatively brief presentation times, as shown in FIGS. 6A and 6B. As shown in FIGS. 6A and 6B, embodiments of the invention reduce the divergence between human and machine performance. FIG. 6A depicts different levels of face coherence constructed using random phase scrambling in images 600, 610, 620 having face coherences of 0.8, 0.6, and 0.4, respectively. FIG. 6B compares performance of human subjects and computer algorithms on the ability to detect face stimuli. The line 630 indicates human performance, while the lines 640, 650, 660, and 670 represent the performance of various computer algorithms.

Figure 7A:
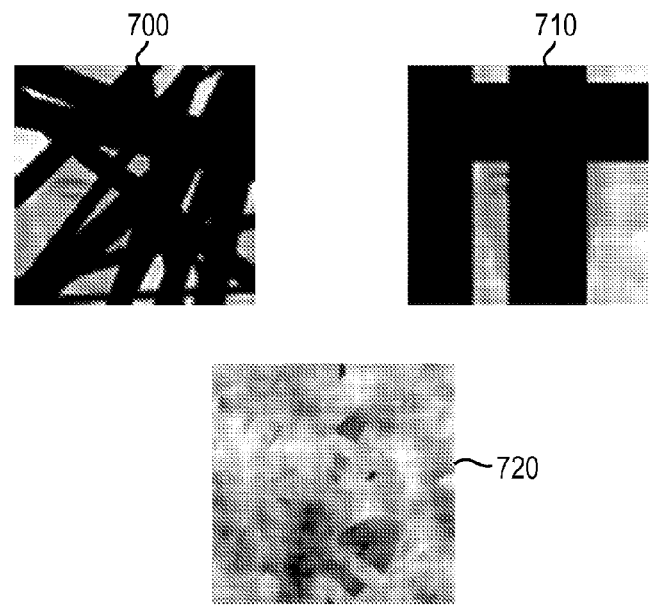
FIG. 7A depicts images of faces obscured by various techniques, in accordance with various embodiments of the invention.
Figure 7B:
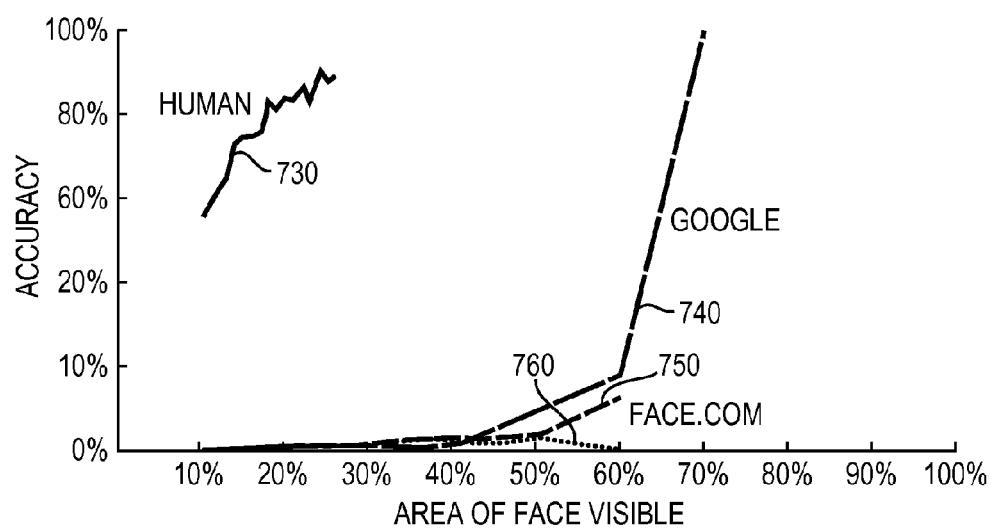
FIG. 7B is a graph of the accuracy of various techniques of facial recognition as a function of visible facial area, in accordance with various embodiments of the invention.

The divergence between human and algorithmic performance is even greater when the generated images are changed to represent a solid-occluder scenario intended to have greater ecological validity, as shown in FIGS. 7A and 7B. The relative strengths and weaknesses of human observers differ greatly from those of the most successful computer algorithms, and humans are able to solve reasonably natural face detection problems that conventional computer algorithms cannot closely approach. Even more so than in the case of noise above, embodiments of the invention directly address deficiencies in algorithmic performance for the detection of occluded faces. FIG. 7A depicts three examples 700, 710, 720 of occluded faces used as stimuli, and FIG. 7B depicts a comparison of human and computer algorithm performance. The line 730 shows human performance for faces occluded with a large number of relatively thin occluders, transposed and normalized for a 100% scale. The other three lines 740, 750, and 760 represent the performance of computer algorithms.

Embodiments of the present invention incorporate a substantial pool of detection data (e.g., more than ten thousand subjects with one hundred trials per subject across all conditions, tested with approximately 7,500 face images) for occluded faces in very large, noisy, perpendicularly obstructed, and Simoncelli textured configurations. These scenarios represent an important set of difficult circumstances for detection, enabling the location of more faces through a better understanding of difficult examples during classifier training.

While embodiments of the present invention are more able than other machine learning approaches to make use of manipulated or "lab" stimuli, they also may accommodate natural, uncontrolled face images that present difficulty to a detector, especially those that are not in a frontal pose. Faces, such as that in image 800, are easily recognized by human subjects in a massive range of poses because of the invariant nature of object recognition in the brain. To address this, embodiments of the invention deploy a test using uncontrolled natural images 810 where annotators are brought off ceiling by using very brief (e.g., approximately 50 ms) presentation times and masking with amplitude-matched phase-scrambled noise, as shown in FIG. 8. For example, annotators may be asked to press a specific key if they observe a face in an image 810 and another key if they do not observe a face in the image. At the end of a series of such queries, end-of-test statistics 820 may be displayed to the annotators 160 via display module 167. A complete face-detection process leveraging the Viola-Jones detector as a basis is depicted in FIG. 5. FIGS. 8A and 8B depict tests that may be utilized in embodiments of the present invention, including a face-detection task with real-world face images that uses rapid presentation and masking to bring subjects off ceiling, and an abstract attribute identification test to increase understanding of the limits of visual label assignment. This data may be used to inform machine learning in accordance with embodiments of the invention.

Visual attributes are a powerful representation for a variety of vision tasks including recognition, classification, and image description. In essence, attributes are semantically meaningful labels that are used by humans to describe parts of a scene. For instance, considering the human face, it may be said that a woman is "beautiful," a man has "black hair," or an emotional state may be described as "happy" or "sad." The attribute model for recognition is compelling at a psychological level, but has been inhibited computationally by the definition of the representation and how it is learned. These problems have been partially addressed by advances in machine learning, where many thousands of training images from the Internet may be harnessed to create attribute classifiers that generalize reasonably well. Attributes may be considered individual "building blocks" for higher-level recognition tasks, with their own complexities and challenges regarding features and training. Thus, rather than initially tackling the more complex problem of face identity, embodiments of the invention consider attributes as a distinct problem. Existing algorithms for attributes have not been informed by human behavior by any significant measure, making embodiments of the invention a novel alternative.

Current attribute models only hint at the utility of human models for improved supervised learning. By quantifying human patterns of error over large sets of attributes and large populations, embodiments of the invention produce well-informed machine learning classifiers that are more effective for this task. Another unique aspect of embodiments of the present invention is the level of abstraction that may be modelled. Prior work in automatic classification has focused on prevalent facial features and easily assignable context, but there is no work to date on highly abstract attributes, even when those attributes may be reliably rated by human subjects. To this end, embodiments of the invention website capture attributes such as "dominance" and "trustworthiness," as shown in FIG. 8B. In accordance with various embodiments, a behavioral measure asks annotators 160 to give pairwise-ratings for pairs 830, 840 of training objects, e.g., which of the two images in each pair is "more trustworthy" or "more dominant." Pairs 830, 840 are exemplary, and annotators 160 will typically be presented with many more pairs during training, e.g., one hundred sets of faces from within a larger set of face data. These pairwise comparisons are used to create an estimated ranking for each face in the dataset, weighted by annotators' mean response time. These attributes are important in a psychological context, where quick judgments of power relationships and personality characteristics may be vital to social interaction, as well as in a computer-vision context, where—in addition to their possible usefulness in applications such as threat detection—the need to understand the limits of attribute quantification has not been adequately addressed.

With the prevalence of machine-learning-based algorithms for general object recognition, embodiments of the invention may apply to numerous existing approaches as a second-stage filter to process results, or as a direct replacement for supervised classification components. Individual classification systems for any visual category may be trained with deeply annotated images, by following the learning procedure with human-weighted loss and margins that are penalized for being inconsistent with those established by human annotators. Deeply annotated data may be obtained by adding new tasks to the crowd-sourced data-collection penalization module (via display of, e.g., a citizen science website), facilitating recognition of broad categories of objects including faces for identity purposes.

EXAMPLE

To validate embodiments of the invention, three different aspects were evaluated: (1) the impact of replacing the hinge loss function with the human-weighted loss function for SVM image classification, (2) the performance of a deeply annotated detector on a standard benchmark data set, and (3) the impact of replacing hinge loss with human-weighted loss in the face-detection scenario. Data from the Face Detection Data Set and Benchmark (FDDB) set, the most current benchmark for unconstrained face detection, was utilized. In this example, FDDB consisted of 2,845 images that contain 5,171 annotated faces, split across 10 different folds for cross-validation-style testing. The set contains a wide range of challenges including occlusions, difficult poses, and low resolution and out-of-focus faces, making it quite suitable for this evaluation.

Figure 9:
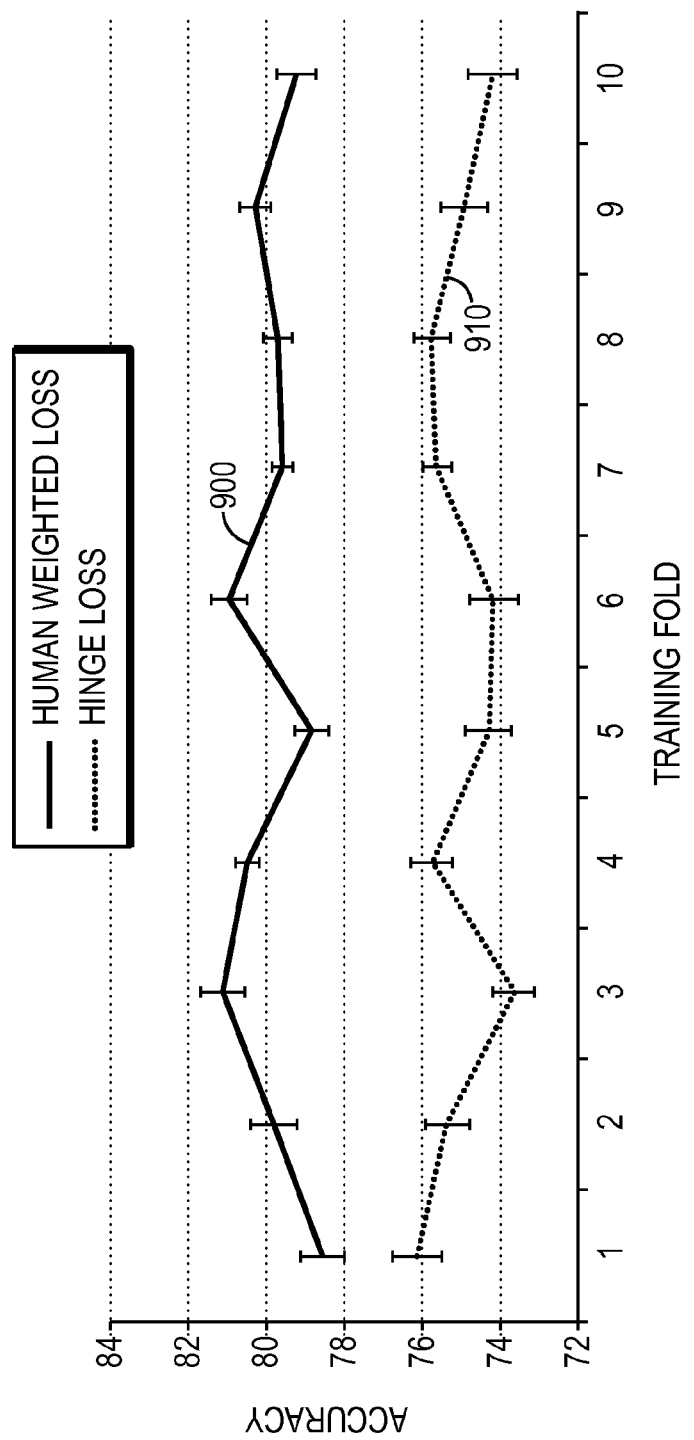
FIG. 9 is a graph comparing the accuracy of face classification utilizing a human-weighted loss function, in accordance with various embodiments of the invention, with face classification utilizing a conventional hinge loss function.

To assess the impact of the choice of loss function during training, a series of classification experiments using data sampled from the FDDB set was completed. For each face in each image, a corresponding negative patch by randomly sampling from the nonface image regions was selected. This yielded ten folds of data with balanced positive and negative examples to be used for training and testing. A classifier for each of the ten folds was then trained using 200 images drawn directly from the FDDB data and 100 images from a deeply annotated set incorporating Simoncelli textures using recorded human accuracy as the weights in the human-weighted loss function, and tested on the remaining nine, for a total of 90 classification tests. The results are shown in FIG. 9. FIG. 9 depicts linear SVM face-classification results for an embodiment of the invention utilizing a human-weighted loss function (curve 900) compared to use of the common hinge loss function (curve 910). Each point represents the average accuracy of nine classification folds produced by a classifier trained on one fold of FDDB (leave-one-out cross validation). The error bars represent standard error. All classifiers were trained with 200 images from FDDB and 100 images from the TestMyBrain Simoncelli textures set, and share a C parameter of 1×10−9. The testing data was composed of all ground-truth faces plus an equally sized set of randomly sampled negative patches. In every case, the human-weighted loss function exhibited improved accuracy, with an average improvement of 4.86% over hinge loss.

Figure 10:
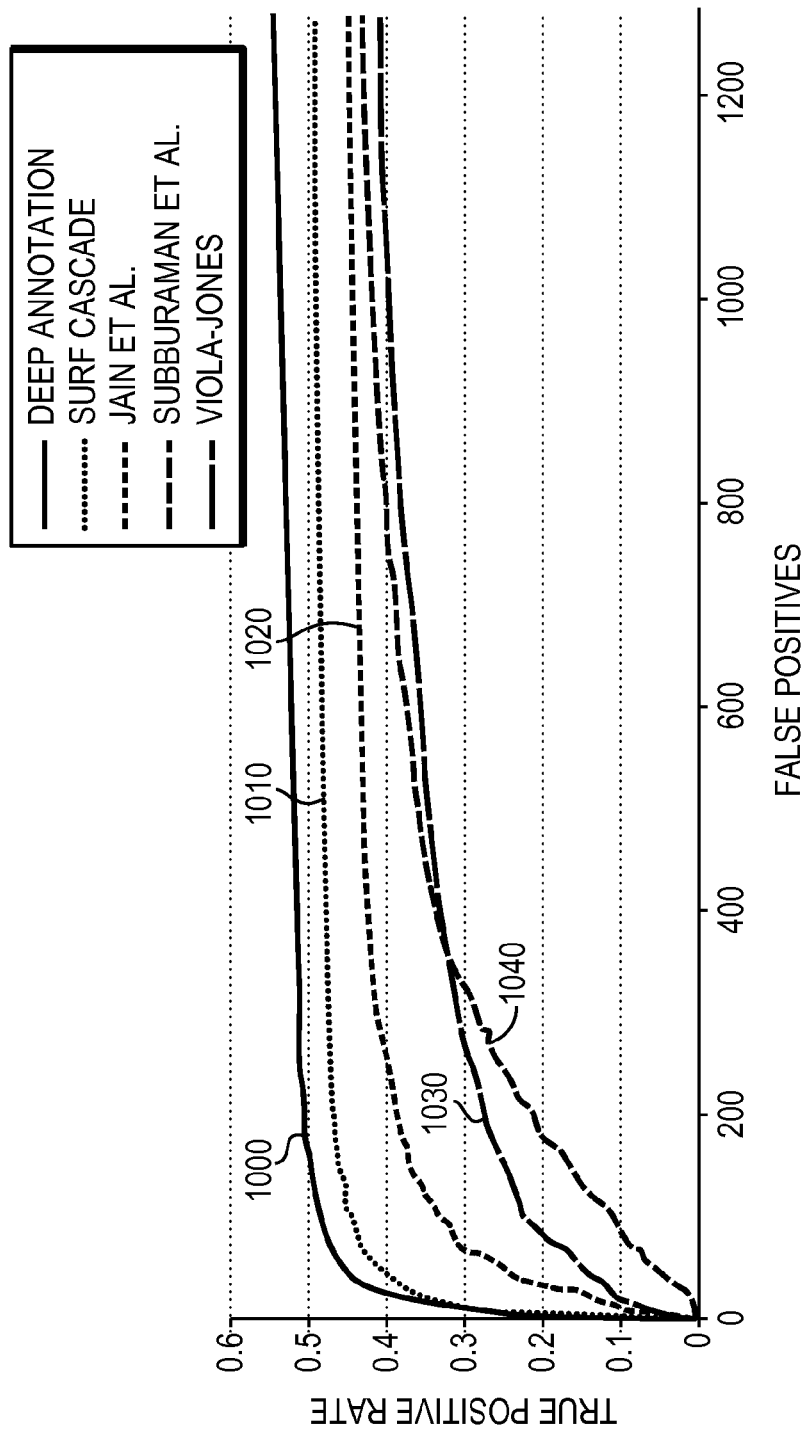
FIG. 10 is a graph comparing the accuracy of face classification utilizing an embodiment of the invention with face classification utilizing a variety of conventional techniques.
Figure 11:
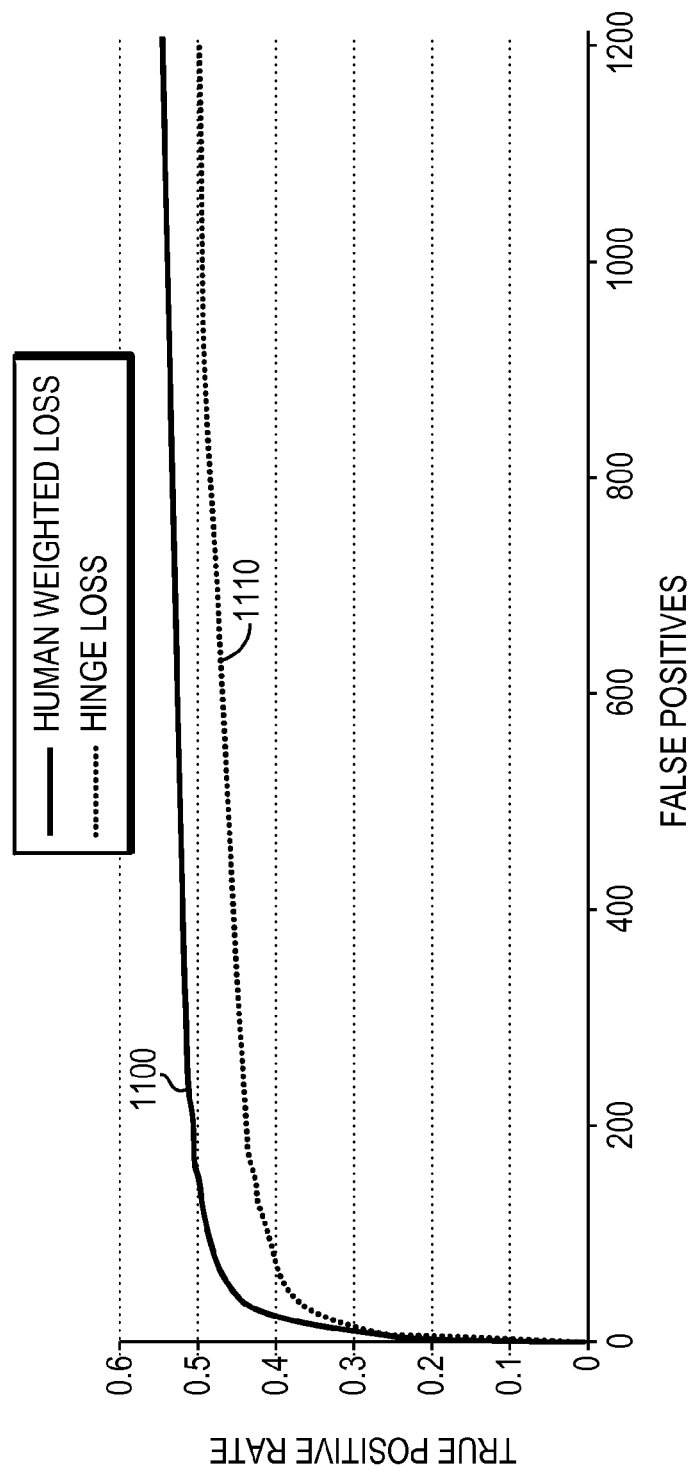
FIG. 11 is a graph comparing the accuracy of face classification utilizing a human-weighted loss function, in accordance with various embodiments of the invention, with face classification utilizing a conventional hinge loss function.

To assess the performance of a face detector in accordance with embodiments of the invention, the FDDB continuous score protocol with outside training data was considered. The results are shown in FIG. 10. Compared to the existing peer-reviewed work reporting results on this test, embodiments of the present invention have the highest level of accuracy. Specifically, line 1000 corresponds to the true positive rate as a function of the number of false positives in accordance with an embodiment of the present invention, while lines 1010, 1020, 1030, and 1040 correspond to results obtained via conventional techniques. As shown, various embodiments of the invention utilize the baseline performance for the Viola-Jones detector as a basis for the classifier. By adding an additional face-filtering stage that incorporates deeply annotated classifiers, embodiments of the invention improve the accuracy of Viola-Jones by a large margin. Thus, compared to the conventional results on this test, embodiments of the invention are more accurate. To ensure that these gains were not an artifact of good features and the base SVM approach, an additional experiment was conducted on the same score protocol with the detector making use of either human-weighted loss or hinge loss. FIG. 11 depicts face-detection results for the FDDB continuous score protocol showing a detection approach implemented with human-weighted loss in accordance with embodiments of the invention (curve 1100), as well as for hinge loss for comparison (curve 1110). Like the classification scenario of FIG. 9, FIG. 11 shows a noticeable increase in accuracy for face detection by using human-weighted loss.

Figure 12:
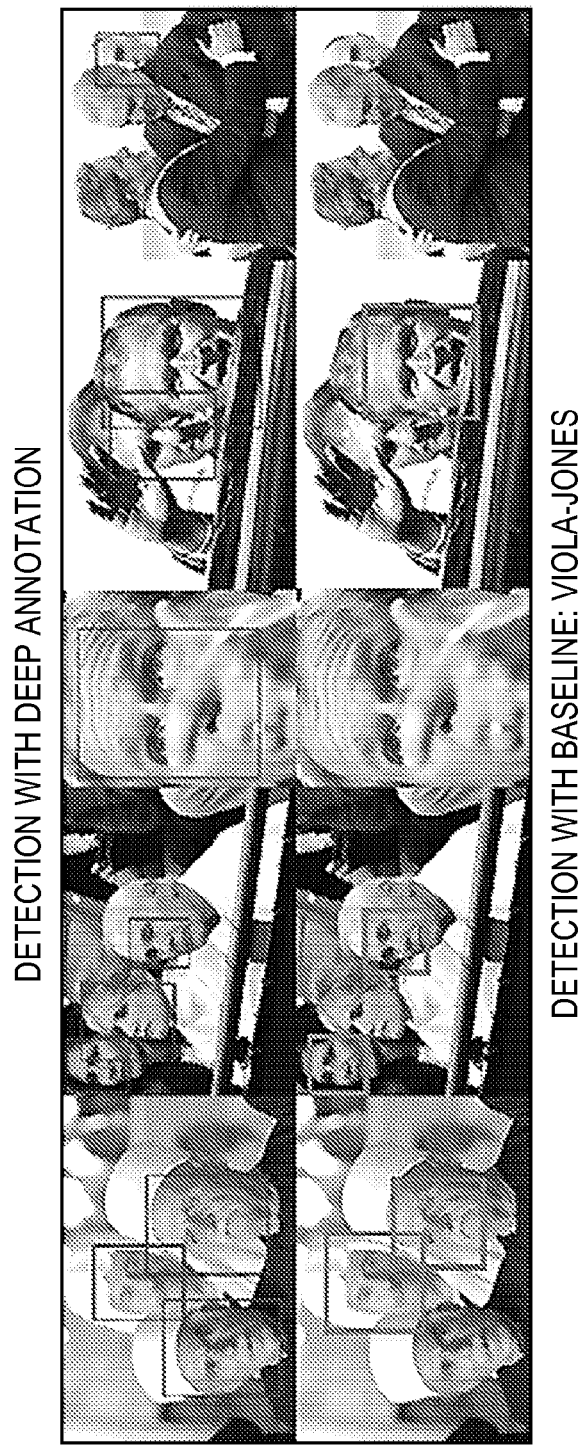
FIG. 12 depicts a comparison of the classification of a series of images via an embodiment of the present invention with the classification of the series of images via a conventional Viola-Jones technique.

A selection of qualitative results are provided in FIG. 12, which indicates that embodiments of the present invention not only provide better recall performance, but also greater tolerance for pose, detection when a face fills the frame, and the detection of strongly occluded faces. FIG. 12 depicts a qualitative comparison between face detection performed by an embodiment of the present invention (upper row of images, with detected faces outlined with rectangles) and by Viola-Jones as implemented in the OpenCV Library (lower row of images), one algorithm that may be utilized as the basis for the detection pipeline in accordance with embodiments of the invention. The face detection performed in accordance with the embodiment of the present invention not only provides better recall performance, but also greater tolerance for pose (as shown in the first two images from the left, in which the embodiment of the present invention detects more faces despite different pose angles), detection when a face fills the frame (as shown in the middle image, in which the embodiment of the present invention successfully detects the face), and the detection of strongly occluded faces (as shown in the first two images from the right, in which occluded faces are successfully detected by the embodiment of the present invention).

Embodiments of the present invention may be directly applied to several important domains where machine learning is found either as an augmentation to an existing algorithm, or as a standalone solution. As described above, computer vision is a relevant area where the success of embodiments of the invention has been demonstrated for the problem of face detection; embodiments of the invention are also applicable to visual attributes and general object recognition. There are additional problem areas within computer vision that may also be addressed by embodiments of the invention, including scene classification, scene understanding, optical character recognition, pose estimation, image retrieval, target detection and tracking, image segmentation and automated visual saliency. In the discipline of human biometrics, embodiments of the invention may be applied to face image pair matching, face verification, face identification, fingerprint verification, fingerprint identification, iris verification, iris identification, gait recognition, handwriting recognition, novel modality matching, and multi-biometric fusion. Important application areas may also benefit from embodiments of the invention, including video surveillance, physical access and authentication, image and video forensics, photo-tagging for social media, computational photography, human-computer interaction (for ordinary users and the disabled), video entertainment/games, robotics, image analysis for biomedical applications, intelligent content archiving, driverless/semiautonomous automobiles, and machine vision for manufacturing.

Beyond vision, there are important problem areas in audio processing to which embodiments of the invention may be applied, including voice recognition, music analysis, audio retrieval, machine translation, and emotion recognition. As in vision, audio-based human biometrics such as speaker verification and speaker identification may be addressed by the embodiments of the present invention. Specific application areas in audio processing where embodiments of the invention apply include audio surveillance, psychical access and authentication, entertainment, human-computer interaction (for ordinary users and the disabled), and intelligent content archiving.

Related to the processing of voice signals, the domain of text processing seeks to understand natural language in an intelligent way based on typed or handwritten characters. Embodiments of the invention apply to this area as well, including the specific problems of natural language processing, machine translation, authorship attribution, topic modeling, computer/formal language processing, and bioinformatics. Specific application areas in text processing where embodiments of the invention apply include search engines, social media analysis (sentiment classification, content summary, textual reuse identification), plagiarism detection, text-based forensics, network intrusion detection, and computer source code profiling.

Finally, the domain of financial analysis incorporates machine learning into a number of problem areas, including market research, market forecasts, and portfolio optimization. Embodiments of the present invention may be applied to all such areas.

It is noted that embodiments of the present invention are not constrained to maximum-margin kernel machines. Embodiments of the present invention may be applied to any form of supervised learning, including neural networks, boosting, bagging, random forests, nearest neighbor algorithms, naive bays classifiers, density estimators, and other forms of statistical regression. Embodiments of the present invention may also be applied as part of a supervised component of semi-supervised or deep-learning algorithms.

In addition to the psychometric measures already mentioned, other psychometric measures which may be used to generate deeply annotated training data within embodiments of the present invention include psychophysical behavioral measures: item response slope, item response offset, mouse path, pairwise ranking, likert scale judgment, continuous scale judgment, continuous color report, and mouse deviation from target location. All of these measures may be weighted by the latent subject ability measure theta.

In addition to behavioral measures, event-related potentials may be used by annotating training data with the slope of the ERP response, the amplitude of the ERP response, the gross magnitude of the ERP response and the divergence of the ERP response from mean, as well as the mean divergence of the ERP response from resting baseline. Related magnetoencephalography measures may also be used, such as MEG signal amplitude, MEG signal slope and MEG signal Euclidean distance from the mean, or MEG signal Euclidean distance from baseline. Magnetic resonance imaging may be used to deep annotate training samples by means of Euclidean distance of signal from mean signal or Kullback-Liebler divergence of signal from mean signal.

Eye-tracking hardware may be used to collect measures suitable for deep annotation such as saccade-to-target accuracy, saccade-to-target latency, number of saccade hops to target, and total number of saccades.

The stimuli that are presented to observers may be degraded by a number of techniques other than the noise and occlusion previously mentioned. These include, for visual stimuli, l/f visual noise, white visual noise, pink visual noise, amplitude-matched phase scrambling, procedural occlusion, second-order statistic-matched backgrounds, second-order statistic-matched blended noise, very brief presentation time, one target, multiple foil search displays, contrast lowering, brightness lowering, false color, inversion, image scrambling, backward masking with noise, backward masking with images, rapid serial visual presentation (RSVP), blur, lightening, specular highlighting, foil image superimposition or composition, generated shadows, outline drawings, two-tone images, silhouettes and selective spatial frequency removal.

For auditory stimuli, the degradation techniques that may be applied include additive white noise, additive pink noise, additive brown noise, overlapped audio, random segment silencing, tempo shifting, pitch shifting, selective frequency removal, phoneme removal, phoneme replacement, and audio scrambling by permutation of arbitrarily sized segments.

For text-based stimuli, the degradation techniques that may be applied include selective word omission, word replacement, the use of difficult fonts, rapid presentation of stimuli, presentation of short snippets of stimuli, and inverted stimuli.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A computer-implemented method for data classification and identification, the method comprising:
providing, over a computer network, data corresponding to a plurality of training objects to a plurality of training devices each associated with one of a plurality of human annotators, each of the training objects comprising features for classification;
displaying the training objects on a display of each of the training devices;
receiving, via communication interfaces of at least some of the training devices, classification data comprising at least some of the training objects annotated, via annotation interfaces of the training devices, by at least some of the annotators with classifications for features thereof;
acquiring psychometric data characterizing the annotation of the training objects by the annotators;
computationally deriving a human-weighted loss function based at least in part on the classification data and the psychometric data, the loss function comprising penalties for misclassification, magnitudes of the penalties increasing with increasing deviation from the classification data;
receiving, by a classification device, data corresponding to a query object different from the plurality of training objects; and
thereafter, computationally classifying, by a computer processor, at least one feature of the query object based at least in part on the human-weighted loss function.

2. The method of claim 1, further comprising displaying the classification of the at least one feature of the query object.

3. The method of claim 1, wherein the magnitudes of the penalties for misclassification are based at least in part on the psychometric data.

4. The method of claim 1, wherein computationally deriving the human-weighted loss function comprises:
computationally classifying, by the computer processor, at least some of the training objects based at least in part on an initial loss function, thereby generating training data;
comparing the training data to the classification data to identify, within the training data, features misclassified in comparison to the classification data;
assigning the penalties for misclassification to the misclassified features in the training data; and
incorporating the penalties for misclassification within the initial loss function to generate the human-weighted loss function.

5. The method of claim 4, wherein the penalties for misclassification are assigned based at least in part on the psychometric data.

6. The method of claim 4, wherein the initial loss function comprises a hinge loss function.

7. The method of claim 1, wherein the psychometric data comprises at least one of (i) response time for classifying one or more features, (ii) accuracy of feature classification, or (iii) presentation time of one or more training objects.

8. The method of claim 1, wherein each of the training objects comprises a digital image, and one or more features for classification comprise human faces.

9. The method of claim 1, wherein at least one of the training devices comprises a computer or mobile computing device.

10. The method of claim 1, wherein the query object comprises a digital image, and at least one said feature of the query object comprises a human face.

11. A system for data classification and identification, the system comprising:
a database of training objects, the database comprising a storage medium populated with stored computer records specifying, for each of a plurality of training objects, (i) classification data comprising annotations received from a plurality of human annotators, and (ii) psychometric data characterizing the annotation of the training object by the plurality of human annotators;

a computer processor;

a classification device for receiving query objects different from the training objects in the database;

a penalization module, executable by the computer processor, for deriving a human-weighted loss function based at least in part on the classification data in the database and the psychometric data of at least some of the training objects in the database, the loss function comprising penalties for misclassification, magnitudes of the penalties increasing with increasing deviation from the classification data; and a classification module, executable by the computer processor, for classifying features of query objects based at least in part on the human-weighted loss function.

12. The system of claim 11, further comprising a display module, executable by the computer processor, for displaying training objects to the plurality of human annotators.

13. The system of claim 12, further comprising a plurality of training devices, each associated with a human annotator, for displaying training objects, each training device comprising a communication interface for receiving training objects and transmitting classification data.

14. The system of claim 13, wherein at least one of the training devices comprises a computer or mobile computing device.

15. The system of claim 11, wherein the psychometric data comprises at least one of (i) response time for classifying one or more features, (ii) accuracy of feature classification, or (iii) presentation time of one or more training objects.

16. The system of claim 11, wherein each of the training objects comprises a digital image, and one or more features for classification comprise human faces.

17. The system of claim 11, wherein at least one query object comprises a digital image, and at least one feature of the query object comprises a human face.

* * * * *

UNITED STATES PATENT AND TRADEMARK OFFICE
CERTIFICATE OF CORRECTION

PATENT NO.        : 9,792,532 B2
APPLICATION NO.   : 14/900397
DATED             : October 17, 2017
INVENTOR(S)       : David Cox et al.

Page 1 of 1

It is certified that error appears in the above-identified patent and that said Letters Patent is hereby corrected as shown below:

In the Specification

At Column 1, Line numbers 15-18, delete:
"This invention was made with government support under Grant Number IIS-0963668 awarded by the National Science Foundation. The government has certain rights in the invention."

And replace with:
-- This invention was made with government support under 0963668 awarded by the National Science Foundation. The government has certain rights in the invention. --

Signed and Sealed this
Twenty-third Day of March, 2021

Drew Hirshfeld
*Performing the Functions and Duties of the*
*Under Secretary of Commerce for Intellectual Property and*
*Director of the United States Patent and Trademark Office*